United States Patent
Takigahira et al.

(10) Patent No.: US 9,225,059 B2
(45) Date of Patent: Dec. 29, 2015

(54) ANTENNA UNIT AND PLANAR WIRELESS DEVICE

(71) Applicant: Fujikura Ltd., Tokyo (JP)

(72) Inventors: Masato Takigahira, Sakura (JP); Hiroyuki Hayashi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 178 days.

(21) Appl. No.: 14/011,039

(22) Filed: Aug. 27, 2013

(65) Prior Publication Data

US 2013/0342419 A1    Dec. 26, 2013

Related U.S. Application Data

(63) Continuation of application No. PCT/JP2012/050700, filed on Jan. 16, 2012.

(30) Foreign Application Priority Data

Mar. 2, 2011    (JP) .................................. 2011-045167

(51) Int. Cl.
*H01Q 1/38*    (2006.01)
*H01Q 1/48*    (2006.01)
(Continued)

(52) U.S. Cl.
CPC ............. *H01Q 1/48* (2013.01); *H01M 10/0436* (2013.01); *H01M 10/425* (2013.01); *H01Q 1/243* (2013.01); *H01Q 9/0421* (2013.01); *H01M 6/40* (2013.01)

(58) Field of Classification Search
CPC . H01M 10/0436; H01M 10/425; H01M 6/40; H01Q 1/243; H01Q 1/48; H01Q 1/44; H01Q 9/0421; Y02E 60/12
USPC ............................ 343/700 MS, 829, 846, 848
See application file for complete search history.

(56) References Cited

U.S. PATENT DOCUMENTS

5,970,393 A * 10/1999 Khorrami et al. ............. 455/129
6,531,246 B2 * 3/2003 Hanafusa et al. ............. 429/162
(Continued)

FOREIGN PATENT DOCUMENTS

CN    1377102 A    10/2002
CN    1449063 A    10/2003
(Continued)

OTHER PUBLICATIONS

International Preliminary Report on Patentability of corresponding International Application No. PCT/JP2012/050700 mailing date of Sep. 12, 2013 (5 pages).
(Continued)

*Primary Examiner* — Tho G Phan
(74) *Attorney, Agent, or Firm* — Westerman, Hattori, Daniels & Adrian, LLP (57) ABSTRACT

An object of the present invention is to provide a planar type antenna unit and a planar type wireless device capable of reducing a projecting area of the wireless device. To achieve the above object, the planar type wireless device of the present invention is provided with a grounded planar antenna 10 which includes a radiating element 11 and a ground plate 12, a thin-film battery 20 which includes a positive-electrode current collector 21 opposing a negative-electrode current collector which is formed by the ground plate 12, and a transmitter/receiver IC arranged at a power feeding point 13 of the grounded planar antenna 10 and including a transmitter-receiver circuit which receives power from the negative-electrode current collector of the thin-film battery 20 and the positive-electrode current collector 21 of the thin-film battery 20, and transmits and receives signals by operating the radiating element 11 of the grounded planar antenna 10.

15 Claims, 9 Drawing Sheets

(51) Int. Cl.
  *H01M 10/04* (2006.01)
  *H01M 10/42* (2006.01)
  *H01Q 1/24* (2006.01)
  *H01Q 9/04* (2006.01)
  *H01M 6/40* (2006.01)

(56) References Cited

U.S. PATENT DOCUMENTS

| | | | |
|---|---|---|---|
| 7,408,512 B1 * | 8/2008 | Rodenbeck et al. | 343/700 MS |
| 7,911,387 B2 * | 3/2011 | Hill et al. | 343/700 MS |
| 8,723,733 B2 * | 5/2014 | Tran et al. | 343/700 MS |
| 8,749,438 B2 * | 6/2014 | Jenwatanavet et al. | 343/702 |
| 2002/0135525 A1 | 9/2002 | Ikegaya et al. | |
| 2004/0009402 A1 | 1/2004 | Adachi et al. | |
| 2007/0222681 A1 * | 9/2007 | Greene et al. | 343/700 MS |
| 2010/0068995 A1 | 3/2010 | Brantner | |
| 2011/0162972 A1 | 7/2011 | Furuya et al. | |

FOREIGN PATENT DOCUMENTS

| | | |
|---|---|---|
| JP | 05-135778 A | 6/1993 |
| JP | 2008-187447 A | 8/2008 |
| JP | 2010-027301 A | 2/2010 |
| JP | 2010-073355 A | 4/2010 |

OTHER PUBLICATIONS

International Search Report dated Mar. 27, 2012, issued in corresponding application No. PCT/JP2012/050700.
Chinese Office Action dated Jun. 27, 2014, issued in Chinese Patent Application No. 201280010791.5, w/English translation (18 pages).
Chinese Office Action dated Sep. 14, 2015, issued in counterpart Chinese Patent Application No. 201280010791.5 with English translation. (17 pages).

* cited by examiner

ANTENNA UNIT AND PLANAR WIRELESS DEVICE

CROSS-REFERENCES TO RELATED APPLICATIONS

This application is a continuation of International Application PCT/JP2012/050700, filed on Jan. 16, 2012, the disclosure of which is incorporated herein by reference in its entirety. This application claims priority under 35 U.S.C. §119 to Japanese Patent Application No. 2011-045167, filed on Mar. 2, 2011, the disclosure of which is incorporated herein by reference in its entirety.

TECHNICAL FIELD

The present invention relates to a planar antenna unit and a planar wireless device.

BACKGROUND ART

To achieve downsizing of a wireless device, a planar wireless device has been proposed (see, for example, Patent Literature 1). In the wireless device of Patent Literature 1, a dipole antenna, a thin-film battery and an integrated circuit (IC) chip are mounted on a single film substrate. The thin-film battery supplies power to the IC chip and the IC chip operates the dipole antenna.

PRIOR ART LITERATURES

Patent Literature

Patent Literature 1: Japanese Patent Application Laid-Open No. 5-135778

SUMMARY OF INVENTION

Technical Problem

An antenna and a thin-film battery used in a planar wireless device are desired to be thin. However, since both of the dipole antenna and the thin-film battery are arranged independently on a single film substrate, it has been difficult for the wireless device in Patent Literature 1 to reduce the thickness of the wireless device.

Therefore, an object of the present invention is to provide a planar type antenna unit and a planar type wireless device capable of reducing the thickness.

Solution to Problem

To achieve the above object, an antenna unit of the present invention is provided with a grounded planar antenna including a radiating element and a ground plate, and a thin-film battery including a positive-electrode current collector opposing a negative-electrode current collector which is formed by the ground plate.

The antenna unit of the present invention is equipped with a grounded planar antenna and a thin-film battery. Here, since the ground plate of the grounded planar antenna is used as the negative-electrode current collector of the thin-film battery, the thickness of the antenna unit provided with the grounded planar antenna and the thin-film battery can be reduced.

In the antenna unit of the present invention, a mirror image of the radiating element is arranged within a plane of the ground plate.

Accordingly, the antenna unit of the present invention can be reduced in thickness without degrading characteristics as the grounded planar antenna.

In the antenna unit of the present invention, a projecting area of the positive-electrode current collector may be smaller than a projecting area of the negative-electrode current collector.

Unlike the ground plate, the positive-electrode current collector of the thin-film battery is not required to have a conductor arranged at the whole face. By setting the projecting area of the positive-electrode current collector small, the cost of components forming the positive-electrode current collector can be reduced while achieving weight saving by reducing weight of the positive-electrode current collector. Further, by setting the projecting area of the positive-electrode current collector which is arranged to oppose the ground plate small, a grounded planar antenna having desired radiating characteristics may be easily realized while suppressing the positive-electrode current collector to interrupt an electric field generated between the radiating element and the ground plate.

The positive-electrode current collector of the antenna unit of the present invention may have a mesh structure.

The projecting area of the positive-electrode current collector can be set smaller than the projecting area of the negative-electrode current collector in the present invention. Here, since it is easy to form a mesh structure at the positive-electrode current collector, a grounded planar antenna having desired radiating characteristics can be easily realized with the small projecting area.

The positive-electrode current collector in the antenna unit of the present invention may be arranged at a position not overlapping with a mirror image of the radiating element.

According to the present invention, the projecting area of the positive-electrode current collector can be set smaller than the projecting area of the negative-electrode current collector. Here, since the positive-electrode current collector does not overlap with the mirror image of the radiating element, a grounded planar antenna having desired radiating characteristics can be easily realized.

To achieve the above objects, the planar wireless device of the present invention is provided with the antenna unit of the present invention and a circuit which receives power from the negative-electrode current collector of the thin-film battery and the positive-electrode current collector of the thin-film battery, and at least transmits or receives signals by operating the radiating element of the grounded planar antenna, and the circuit is arranged at the power feeding point of the grounded planar antenna.

Since the planar type wireless device of the present invention is provided with the antenna unit of the present invention, the thickness of the antenna unit including the grounded planar antenna and the thin-film battery can be made thin. Accordingly, in the planar type wireless device of the present invention, the thickness of the wireless device can be reduced.

Here, the above inventions may be combined as much as possible.

According to the present invention, a planar type antenna unit and a planar type wireless device capable of reducing the thickness can be provided.

BRIEF DESCRIPTION OF DRAWINGS

FIG. 1A is schematic structural view of an antenna unit according to an embodiment. FIG. 1B illustrates a structure of the thin-film battery at a positive-electrode side.

FIG. 5A illustrate a second embodiment of a positive-electrode current collector. FIG. 5A illustrates a structure of a thin-film battery at a negative-electrode side.

FIG. 5B illustrate a second embodiment of a positive-electrode current collector. FIG. 5B illustrates a structure of the thin-film battery at a positive-electrode side.

FIG. 6A illustrate a third embodiment of a positive-electrode current collector. FIG. 6A illustrates a structure of a thin-film battery at a negative-electrode side.

FIG. 6B illustrate a third embodiment of a positive-electrode current collector. FIG. 6B illustrates a structure of the thin-film battery at a positive-electrode side.

DESCRIPTION OF EMBODIMENTS

Embodiments of the present invention will be described with reference to the attached drawings. The embodiments described in the following are examples of the present invention and the present invention is not limited to the following embodiments. Here, structural elements with the same numeral in the specification and the drawings denote the same.

Figure 1A:
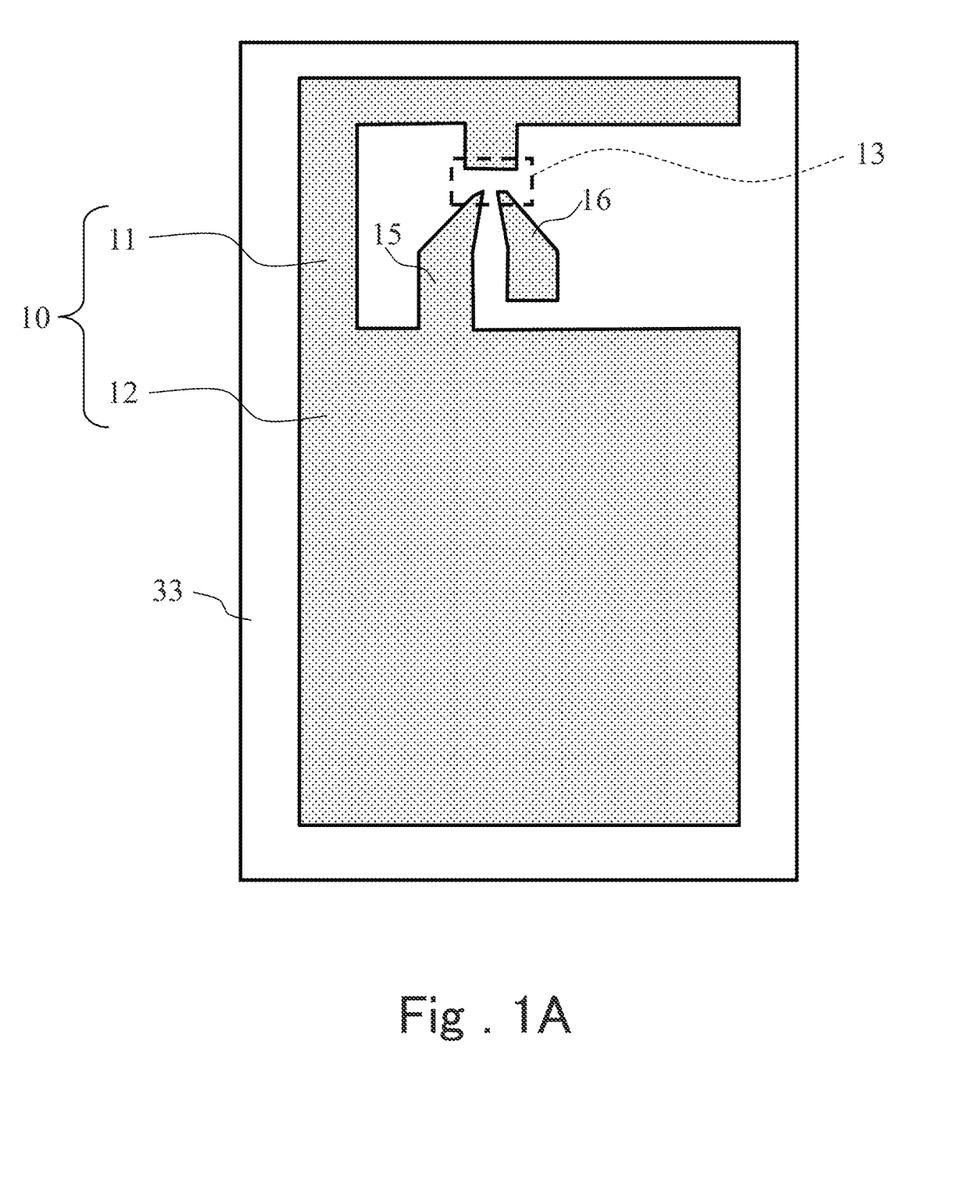
FIG. 1A illustrates a structure of a thin-film battery at a negative-electrode side and FIG. 1B is schematic structural view of an antenna unit according to an embodiment.
Figure 1B:
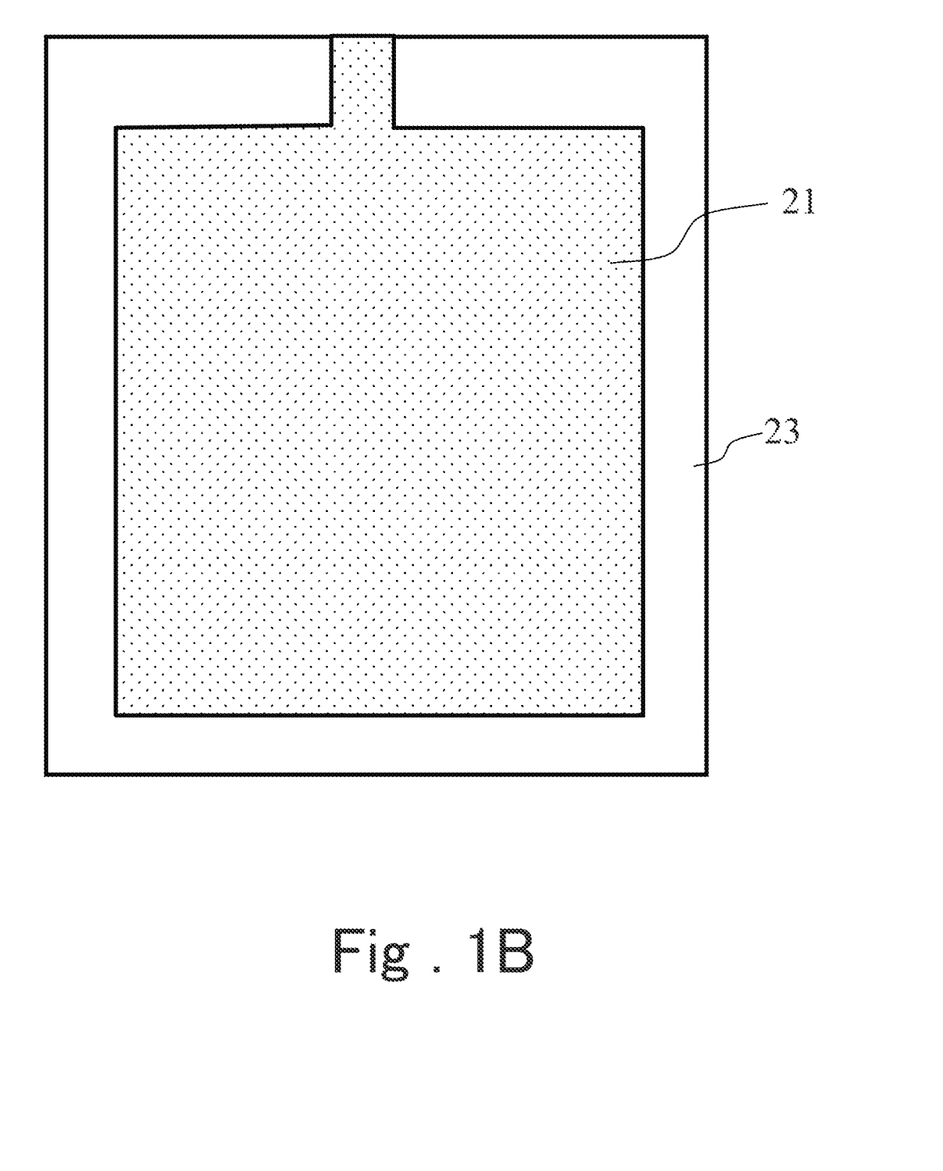

FIGS. 1A and 1B are schematic structural views of an antenna unit according to the present embodiment. FIG. 1A illustrates a structure of a thin-film battery at a negative-electrode side and FIG. 1B illustrates a structure of the thin-film battery at a positive-electrode side. The antenna unit according to the present embodiment includes a grounded planar antenna 10. The grounded planar antenna 10 is provided with a radiating element 11 and a ground plate 12 which is arranged on a plane including a mirror image of the radiating element 11. By feeding power to a power feeding point 13, the antenna unit according to the present embodiment performs a function as the grounded planar antenna 10. A shape of the radiating element 11 is arbitrarily set. For example, the grounded planar antenna 10 may be applied to an arbitrary grounded planar antenna other than an inverse F-shaped antenna illustrated in FIGS. 1A and 1B.

Further, the antenna unit according to the present embodiment is provided with the ground plate 12, a positive-electrode current collector 21, and film substrates 23 and 33. The ground plate 12 and a negative-electrode current collector are formed with a conductive material such as a metallic thin film. Thus, the ground plate 12 is used as the negative-electrode current collector of the thin-film battery 20.

Figure 2:
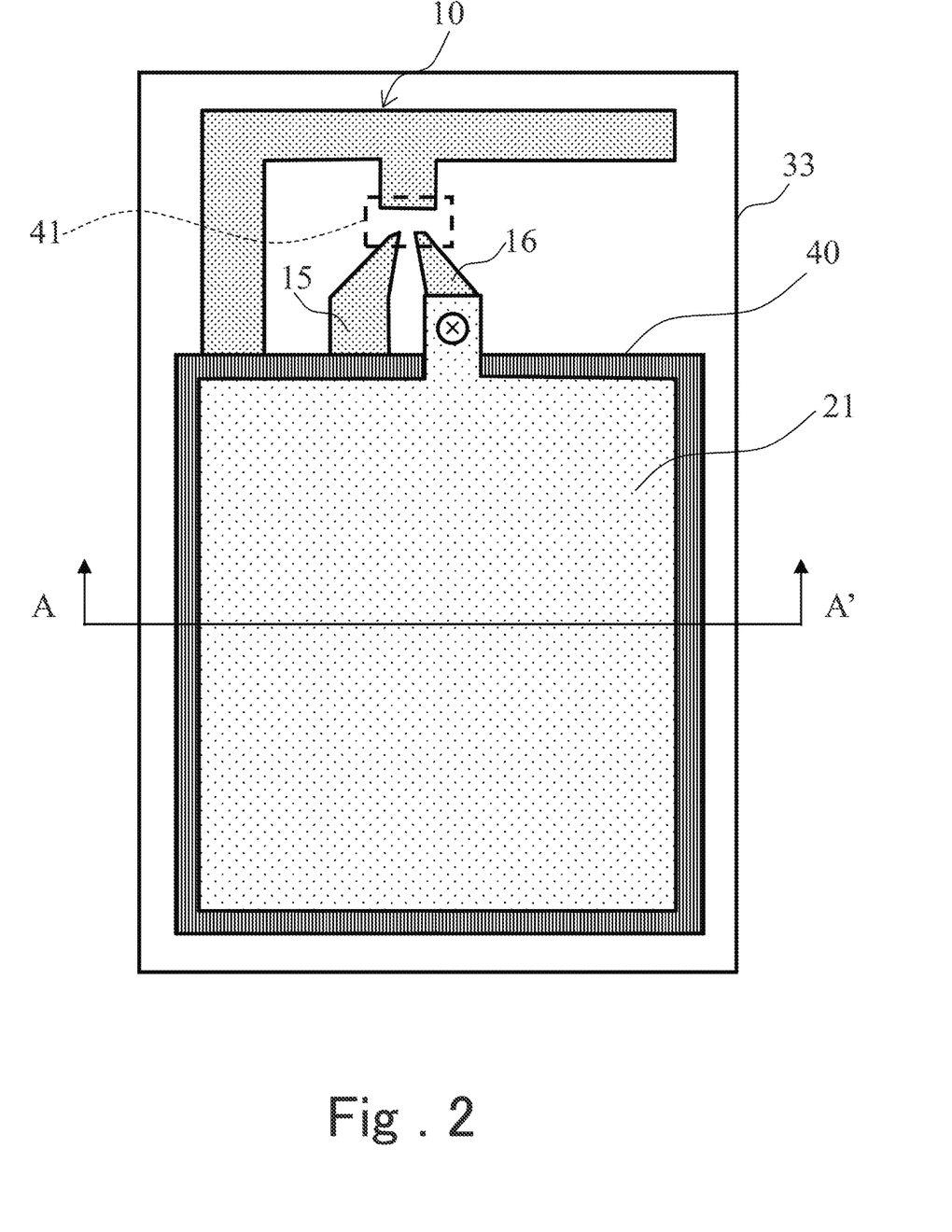
FIG. 2 is a schematic structural view in which the negative-electrode side and the positive-electrode side of the thin-film battery are overlapped.
Figure 3:
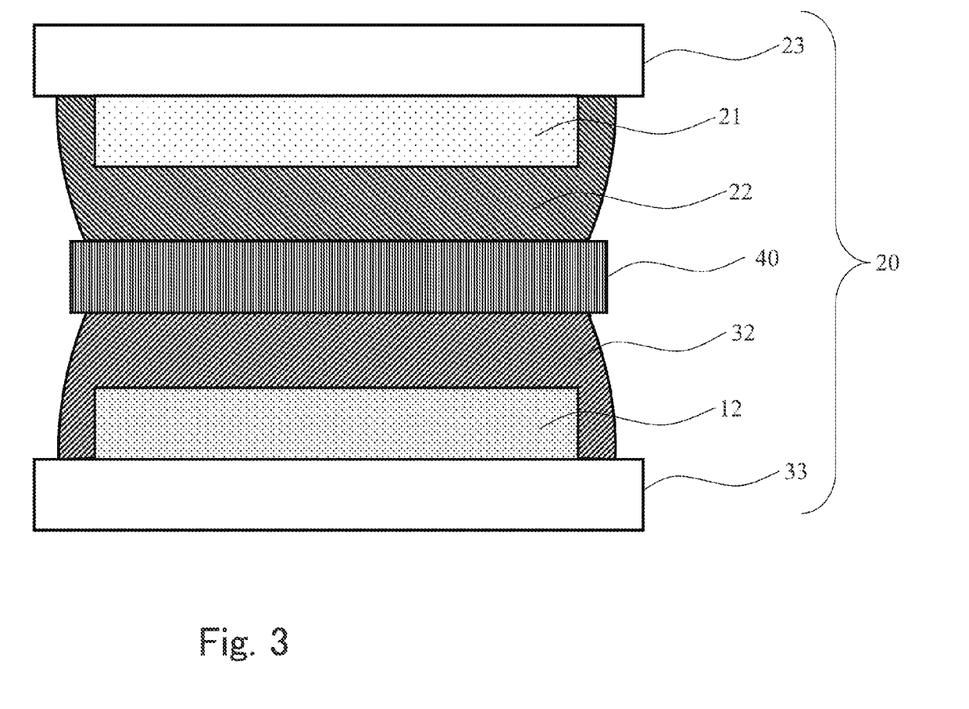
FIG. 3 illustrates an example of a section at A-A'.

FIG. 2 is a schematic structural view in which the negative-electrode side and the positive-electrode side of the thin-film battery are overlapped. FIG. 3 illustrates an example of a section A-A'. As illustrated in FIG. 3, the film substrate 23, the positive-electrode current collector 21, a positive-electrode active material 22, a separator 40, a negative-electrode active material 32, the ground plate 12 and the film substrate 33 are stacked sequentially. The ground plate 12 and the positive-electrode current collector 21 are arranged at positions to be opposed so that the negative-electrode current collector and the positive-electrode current collector 21 of the thin-film battery 20 are opposed. Accordingly, a potential difference occurs between the positive-electrode current collector 21 and the ground plate 12 and the antenna unit according to the present embodiment performs a function as the thin-film battery 20.

As described above, the ground plate 12 being a single component has two functions. Accordingly, the functions of the thin-film battery and the grounded planar antenna can be realized while being lowered in height for a card-type wireless device having a restriction in area, for example. Here, in the present embodiment, lowering in height means reducing the thickness. Further, manufacturing cost can be reduced by reducing component cost, simplifying a manufacturing process and shortening manufacturing time.

The planar wireless device illustrated in FIG. 2 is provided with the antenna unit according to the present embodiment and a transmitter/receiver IC 41. The transmitter/receiver IC 41 receives power from the ground plate 12 which is the negative-electrode current collector of the thin-film battery 20 and the positive-electrode current collector 21 of the thin-film battery 20. For example, as illustrated in FIG. 1A, a conductor 15 which connects the power feeding point 13 and the ground plate 12 and a conductor 16 which can be connected to the power feeding point 13 are formed on the film substrate 33. Then, the conductor 16 and the positive-electrode current collector 21 are swaged, as illustrated in FIG. 2. In this state, the transmitter/receiver IC 41 is arranged at the power feeding point 13 of the grounded planar antenna 10 illustrated in FIG. 1A. Accordingly, a negative-electrode terminal of the transmitter/receiver IC 41 can be connected to the ground plate 12 and a positive-electrode terminal of the transmitter/receiver IC 41 can be connected to the positive-electrode current collector 21. As a potential difference occurs between the ground plate 12 and the positive-electrode current collector 21, power is supplied to the transmitter/receiver IC 41.

The transmitter/receiver IC 41 includes a transmitter-receiver circuit which transmits and receives signals by operating the radiating element 11 of the grounded planar antenna 10. Accordingly, the planar type wireless device according to the present embodiment can transmit and receive signals using the grounded planar antenna 10.

Figure 4:
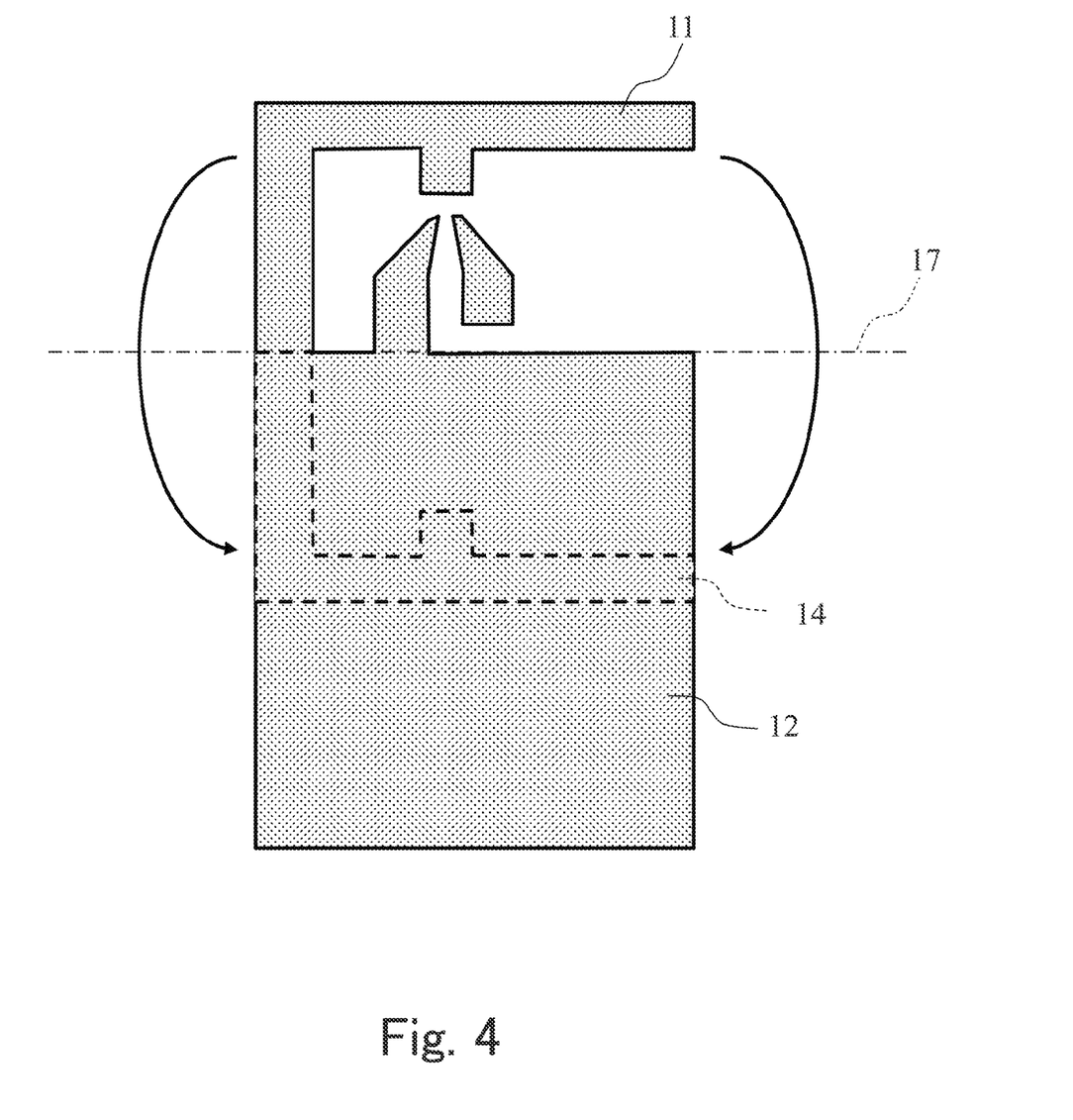
FIG. 4 illustrates an example of a mirror image of a radiating element 11.

The ground plate 12 includes a mirror image of the radiating element 11 in a face thereof. Accordingly, a function as the grounded planar antenna can be performed. FIG. 4 illustrates an example of the mirror image of the radiating element 11. A mirror image 14 appears at a position symmetric about a ground face 17. The ground plate 12 is at least arranged at a position of the mirror image of the radiating element 11 on a plane including the ground plate 12.

The positive-electrode current collector 21 illustrated in FIG. 1B is a first embodiment of the positive-electrode current collector. The positive-electrode current collector in the first embodiment has a shape in which the whole ground plate 12 is overlapped and opposed to the positive-electrode current collector 21. By adopting such a shape, the grounded planar antenna 10 and the thin-film battery 20 can be realized with a small projecting area. Here, the projecting area means an occupying area on a plane of the planar antenna.

The positive-electrode current collector 21 of the thin-film battery 20 is only required to perform a function of the thin-film battery 20. Therefore, the projecting area of the positive-electrode current collector 21 may be set smaller than the projecting area of the ground plate 12 being the negative-electrode current collector. Accordingly, the cost of components forming the positive-electrode current collector 21 can be reduced while achieving weight saving by reducing weight of the positive-electrode current collector 21.

Since the ground plate 12 and the positive-electrode current collector 21 are arranged to be opposed and the positive-electrode current collector 21 is a conductor, there is a possibility that the grounded planar antenna 10 draws influence from the positive-electrode current collector 21. Thus, the positive-electrode current collector 21 is preferably shaped to prevent influence on the grounded planar antenna 10.

Figure 5A:
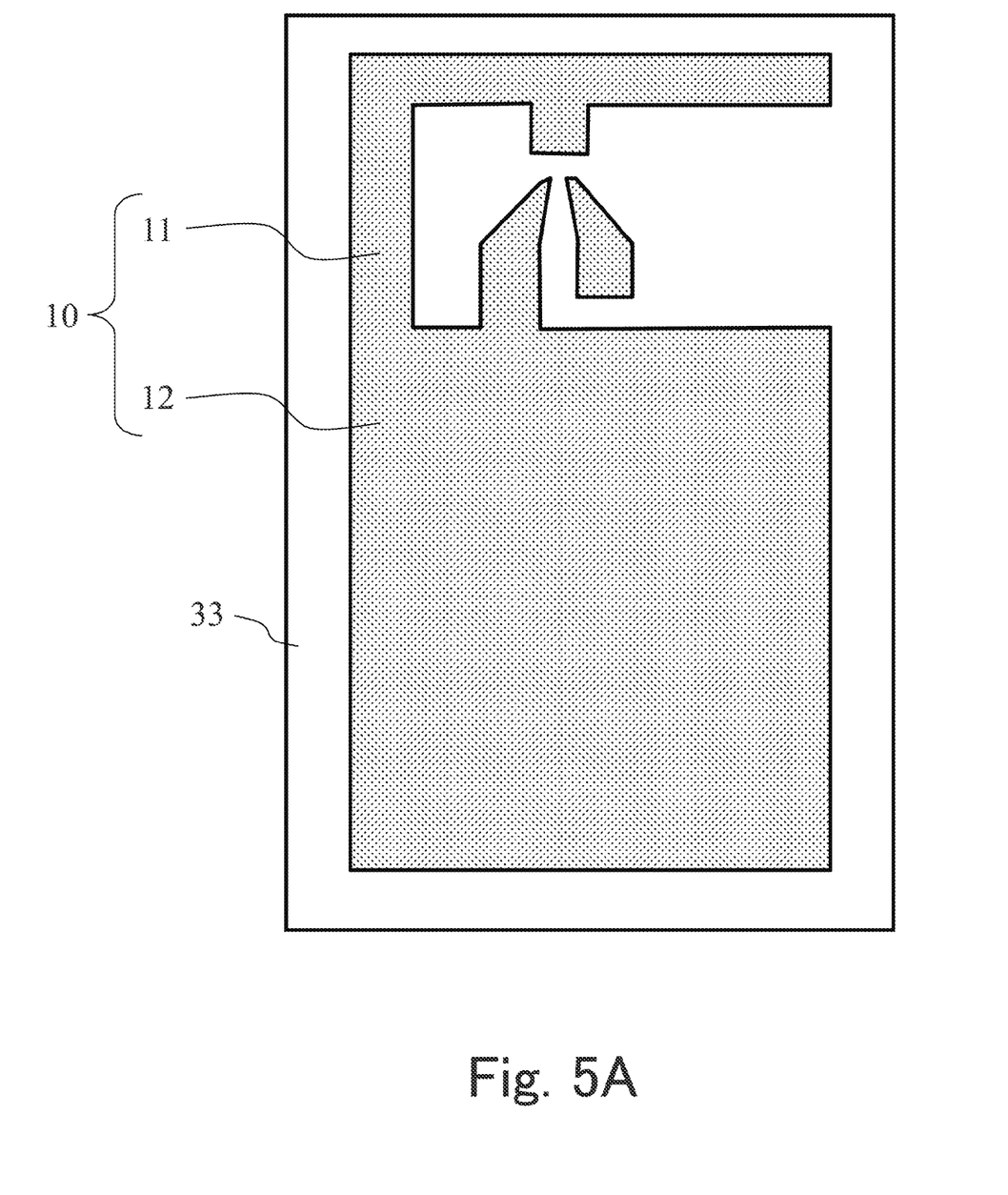
Figure 5B:
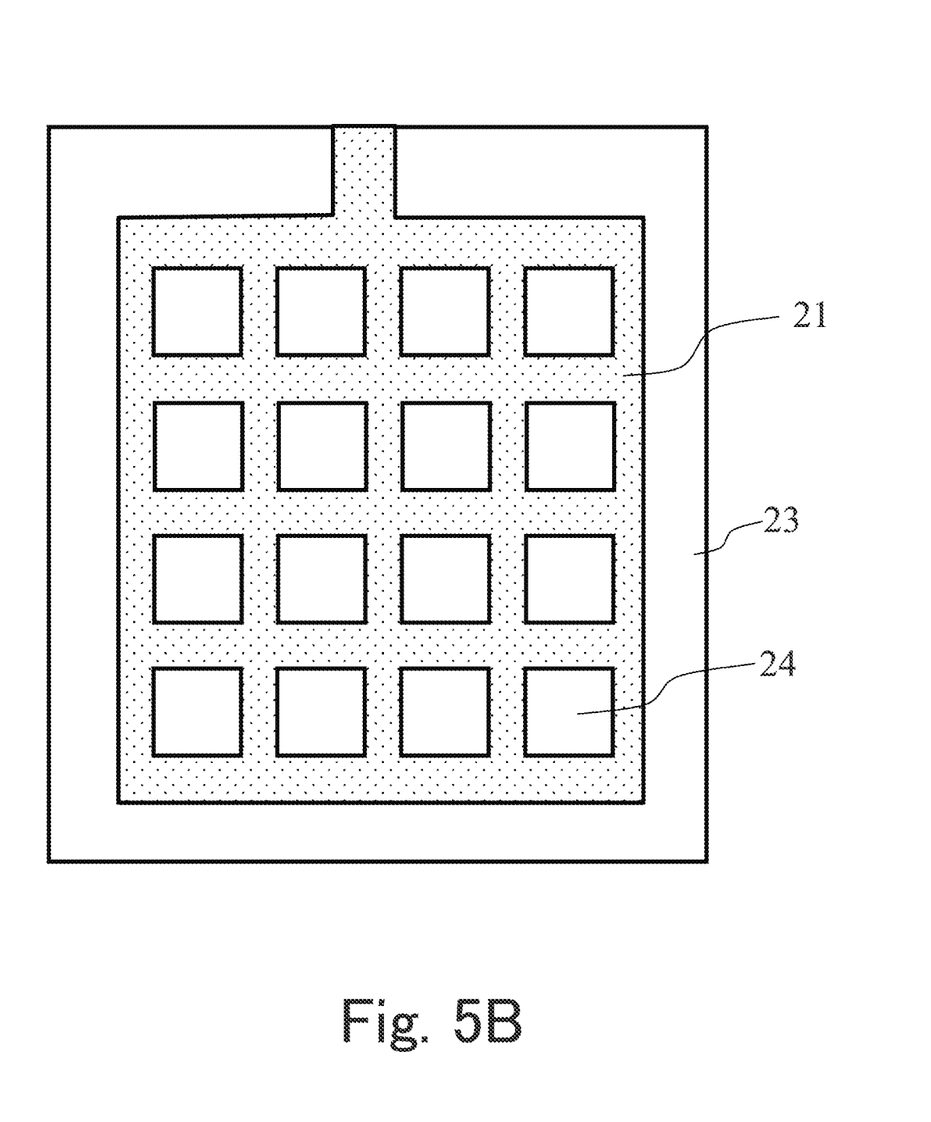

FIGS. 5A and 5B illustrate a second embodiment of a positive-electrode current collector. FIG. 5A illustrates a structure of a thin-film battery at a negative-electrode side and FIG. 5B illustrates a structure of the thin-film battery at a positive-electrode side. A positive-electrode current collector 21 has a mesh structure in the positive-electrode current collector in the second embodiment. For example, the positive-electrode current collector 21 has an air gap portion 24 where a conductor is not arranged. The air gap portion 24 may be one or plural. The shape of the air gap portion 24 may be set to an arbitrary shape such as circular or polygonal. The shape of the air gap portion 24 may be circular and the positive-electrode current collector 21 may be reed-shaped. By adopting the positive-electrode current collector in the second embodiment, an antenna having desired radiating characteristics may be easily realized while preventing the positive-electrode current collector 21 from interrupting an electric field from the radiating element 11 without lowering a power collecting function of the positive-electrode current collector 21.

Figure 6A:
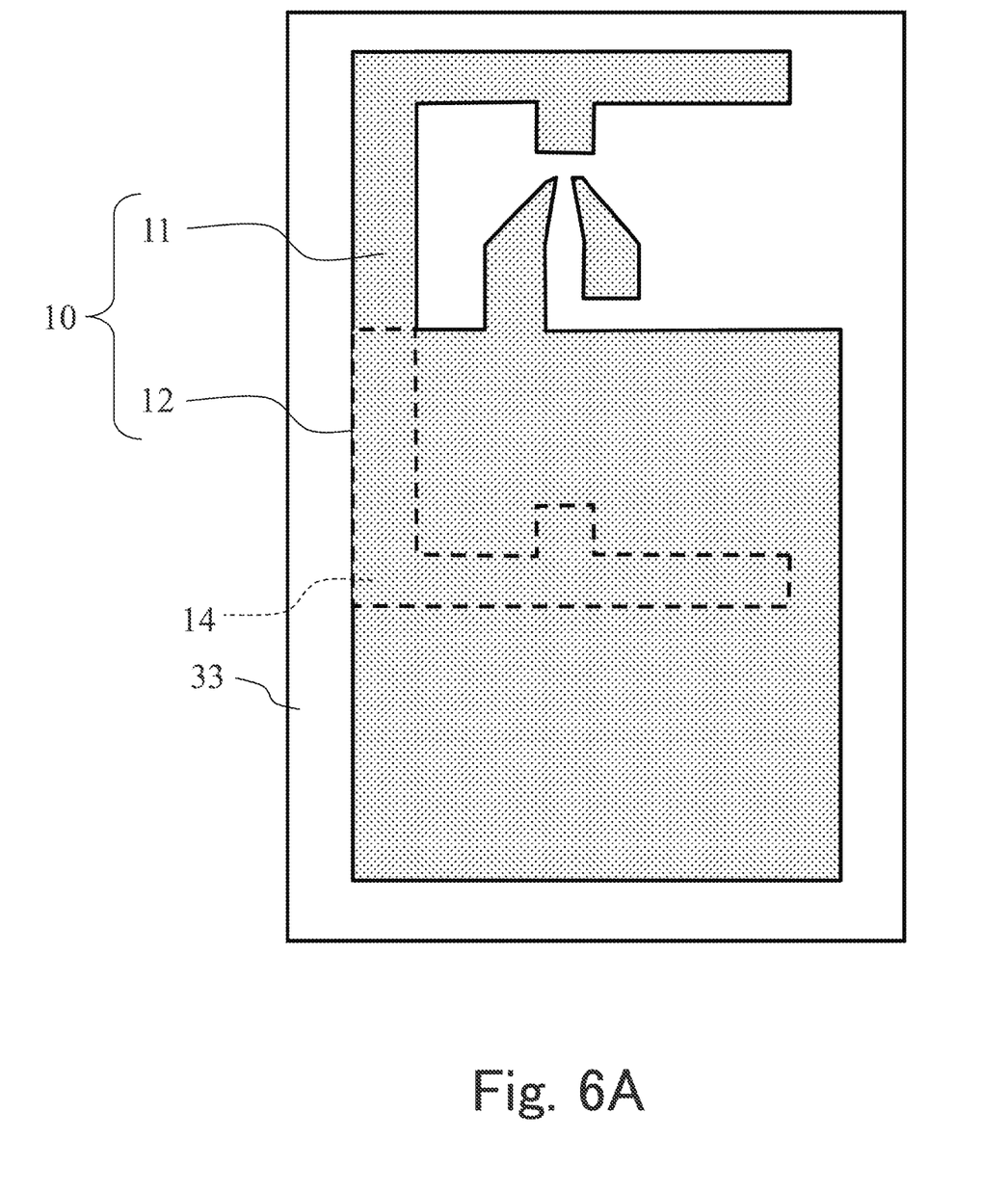
Figure 6B:
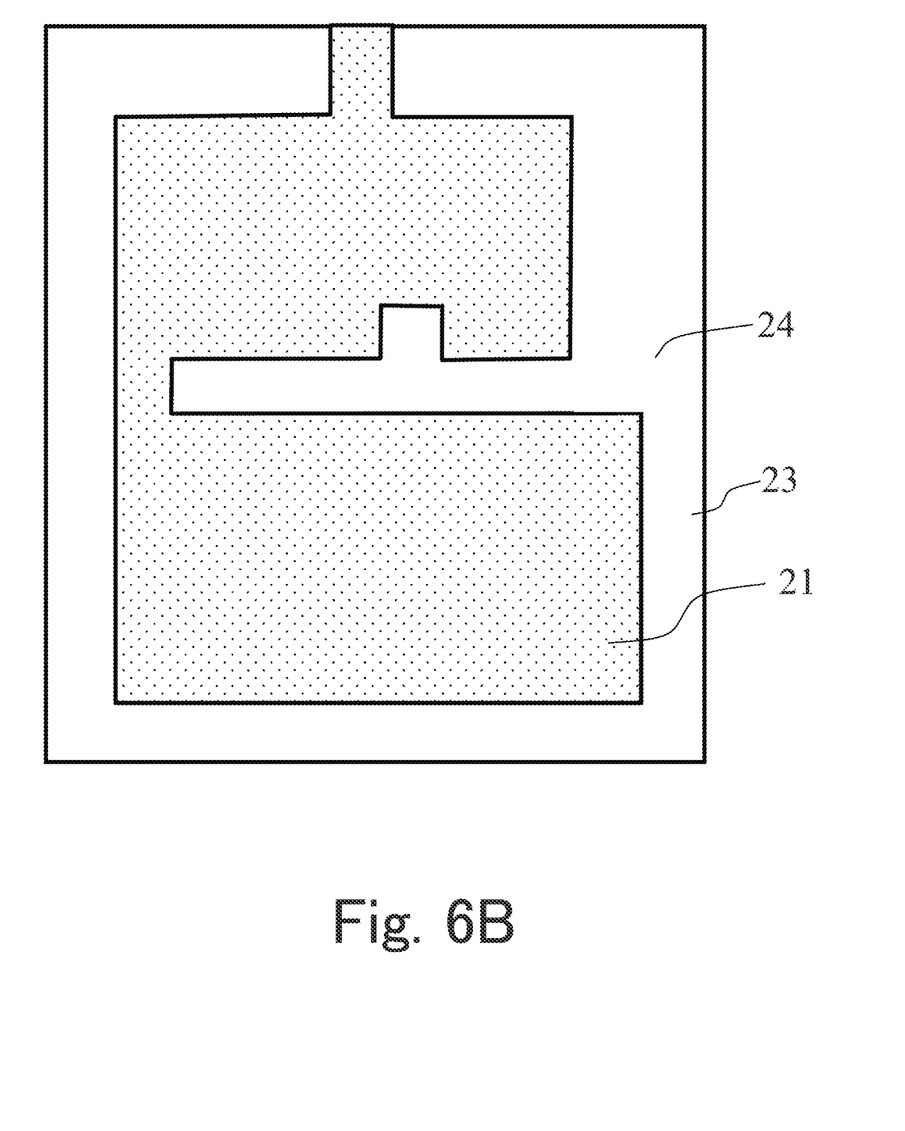

FIGS. 6A and 6B illustrate a third embodiment of a positive-electrode current collector. FIG. 6A illustrates a structure of a thin-film battery at a negative-electrode side and FIG. 6B illustrates a structure of the thin-film battery at a positive-electrode side. The positive-electrode current collector in the third embodiment is arranged at a position not overlapping with the mirror image of the radiating element 11. For example, an air gap portion 24 where a conductor is not arranged is formed at a position overlapping with the mirror image of the radiating element 11 among the positive-electrode current collector 21. By adopting the positive-electrode current collector in the third embodiment, an antenna having desired radiating characteristics may be easily realized while remarkably preventing the positive-electrode current collector 21 from interrupting an electric field from the radiating element 11.

Here, the positive-electrode current collector in the second embodiment and the positive-electrode current collector in the third embodiment may be combined. For example, the air gap portion 24 may be formed at a position where the mirror image of the radiating element 11 is overlapped among the positive-electrode current collector 21 while adopting the positive-electrode current collector 21 having a mesh structure as a whole.

In the present embodiment, the transmitter/receiver IC 41 which transmits and receives signals by operating the radiating element 11 has been described as an example of an element to connect to the radiating element 11 of the grounded planar antenna 10, however, the element to connect to the radiating element 11 may be an IC only including a transmitting circuit to perform transmission from the radiating element 11 or may be an IC only including a receiving circuit to receive signals from the radiating element 11.

INDUSTRIAL APPLICABILITY

The present invention can be applied to information and communication industry.

REFERENCE SIGNS LIST

10: Grounded planar antenna
11: Radiating element
12: Ground plate
13: Power feeding point
14: Mirror image
15, 16: Conductor
17: Ground face
20: Thin-film battery
21: Positive-electrode current collector
22: Positive-electrode active material
23: Film substrate
24: Air gap portion
32: Negative-electrode active material
33: Film substrate
40: Separator
41: Transmitter/receiver IC

The invention claimed is:

1. An antenna unit, comprising:
a grounded planar antenna including a radiating element and a ground plate; and
a thin-film battery including a positive-electrode current collector opposing a negative-electrode current collector which is formed by the ground plate,
wherein the ground plate and the positive-electrode current collector are overlapped, and
wherein the radiating element and the positive-electrode current collector are not overlapped.

2. The antenna unit according to claim 1, wherein a mirror image of the radiating element is arranged within a plane of the ground plate.

3. A planar type wireless device, comprising:
the antenna unit according to claim 2; and
a circuit which receives power from the negative-electrode current collector of the thin-film battery and the positive-electrode current collector of the thin-film battery, and at least transmits or receives signals by operating the radiating element of the grounded planar antenna,
wherein the circuit is arranged at a power feeding point of the grounded planer antenna.

4. The antenna unit according to claim 1, wherein a projecting area of the positive-electrode current collector is smaller than a projecting area of the negative-electrode current collector.

5. A planar type wireless device, comprising:
the antenna unit according to claim 4; and
a circuit which receives power from the negative-electrode current collector of the thin-film battery and the positive-electrode current collector of the thin-film battery, and at least transmits or receives signals by operating the radiating element of the grounded planar antenna,
wherein the circuit is arranged at a power feeding point of the grounded planer antenna.

6. The antenna unit according to claims 1, wherein the positive-electrode current collector has a mesh structure.

7. A planar type wireless device, comprising:
the antenna unit according to claim 6; and
a circuit which receives power from the negative-electrode current collector of the thin-film battery and the positive-electrode current collector of the thin-film battery, and at least transmits or receives signals by operating the radiating element of the grounded planar antenna,
wherein the circuit is arranged at a power feeding point of the grounded planer antenna.

8. The antenna unit according to claim 1, wherein the positive-electrode current collector is arranged at a position not overlapping with a mirror image of the radiating element.

9. A planar type wireless device, comprising:
the antenna unit according to claim 8; and
a circuit which receives power from the negative-electrode current collector of the thin-film battery and the positive-electrode current collector of the thin-film battery, and at least transmits or receives signals by operating the radiating element of the grounded planar antenna,
wherein the circuit is arranged at a power feeding point of the grounded planer antenna.

10. A planar type wireless device, comprising:
the antenna unit according to claim 1; and
a circuit which receives power from the negative-electrode current collector of the thin-film battery and the positive-electrode current collector of the thin-film battery, and at least transmits or receives signals by operating the radiating element of the grounded planar antenna,
wherein the circuit is arranged at a power feeding point of the grounded planer antenna.

11. A planar type wireless device, comprising:
an antenna unit, comprising:
 a grounded planar antenna including a radiating element and a ground plate; and
 a thin-film battery including a positive-electrode current collector opposing a negative-electrode current collector which is formed by the ground plate; and
a circuit which receives power from the negative-electrode current collector of the thin-film battery and the positive-electrode current collector of the thin-film battery, and at least transmits or receives signals by operating the radiating element of the grounded planar antenna,
wherein the circuit is arranged at a power feeding point of the grounded planer antenna.

12. The planar type wireless device according to claim 11, wherein a mirror image of the radiating element is arranged within a plane of the ground plate.

13. The planar type wireless device according to claim 11, wherein a projecting area of the positive-electrode current collector is smaller than a projecting area of the negative-electrode current collector.

14. The planar type wireless device according to claims 11, wherein the positive-electrode current collector has a mesh structure.

15. The planar type wireless device according to claim 11, wherein the positive-electrode current collector is arranged at a position not overlapping with a mirror image of the radiating element.

* * * * *